(12) United States Patent
Wilde et al.

(10) Patent No.: US 8,508,489 B2
(45) Date of Patent: *Aug. 13, 2013

(54) SYSTEM AND METHOD FOR INJECTING INK INTO AN APPLICATION

(75) Inventors: Keith Correy Wilde, Calgary (CA); Taco van Ieperen, Calgary (CA)

(73) Assignee: SMART Technologies ULC (CA)

( * ) Notice: Subject to any disclaimer, the term of this patent is extended or adjusted under 35 U.S.C. 154(b) by 389 days.

This patent is subject to a terminal disclaimer.

(21) Appl. No.: 12/396,713

(22) Filed: Mar. 3, 2009

(65) Prior Publication Data

US 2009/0160818 A1    Jun. 25, 2009

Related U.S. Application Data

(63) Continuation of application No. 10/164,307, filed on Jun. 7, 2002, now Pat. No. 7,499,033.

(51) Int. Cl.
*G06F 3/041* (2006.01)
*G06F 3/033* (2006.01)

(52) U.S. Cl.
USPC .......................................... 345/173; 715/863

(58) Field of Classification Search
USPC ........... 345/173–179, 156; 178/18.01–18.09, 178/18.11, 19.01–19.06; 715/863
See application file for complete search history.

(56) References Cited

U.S. PATENT DOCUMENTS

| | | | |
|---|---|---|---|
| 5,063,600 A | 11/1991 | Norwood | |
| 5,347,295 A * | 9/1994 | Agulnick et al. | 345/156 |
| 5,404,458 A | 4/1995 | Zetts | |
| 5,448,263 A | 9/1995 | Martin | |
| 5,455,901 A | 10/1995 | Friend et al. | |
| 5,500,937 A | 3/1996 | Thompson-Rohrlich | |
| 5,566,248 A | 10/1996 | Ulrich | |
| 5,680,480 A | 10/1997 | Beernink et al. | |
| 6,005,973 A | 12/1999 | Seybold et al. | |
| 6,088,481 A | 7/2000 | Okamoto et al. | |
| 6,661,409 B2 | 12/2003 | Demartines et al. | |
| 2002/0011993 A1 | 1/2002 | Lui et al. | |
| 2002/0057263 A1 | 5/2002 | Keely et al. | |
| 2002/0067854 A1 | 6/2002 | Reintjes et al. | |
| 2003/0063073 A1 * | 4/2003 | Geaghan et al. | 345/173 |
| 2003/0214540 A1 | 11/2003 | Huapaya et al. | |
| 2006/0239561 A1 | 10/2006 | Huapaya et al. | |

FOREIGN PATENT DOCUMENTS

| | | | |
|---|---|---|---|
| WO | 94/10678 A1 | 5/1994 | |
| WO | 02/03316 A1 | 1/2002 | |

* cited by examiner

*Primary Examiner* — Stephen Sherman
(74) *Attorney, Agent, or Firm* — Katten Muchin Rosenman LLP

(57) ABSTRACT

A touch system includes a touch panel having a touch surface and a projector for projecting images onto the touch surface. A computer executing an applications program is coupled to the touch panel and the projector. The computer is responsive to contact output generated by the touch panel in response to proximity of a pointer to the touch surface and updates image data conveyed to the projector so that the images presented on the touch surface reflect the pointer activity. The computer executes a gesture responsive ink injection routine to detect when a selected gesture is made with the pointer on the touch surface. The gesture responsive ink injection routine performs recognition to convert ink drawn on the touch surface into a form suitable for the applications program when the selected gesture is recognized and enters the recognized text into the application.

39 Claims, 10 Drawing Sheets

SYSTEM AND METHOD FOR INJECTING INK INTO AN APPLICATION

This application is a continuation of U.S. patent application Ser. No. 10/164,307, filed Jun. 7, 2002, now U.S. Pat. No. 7,499,033, issued Mar. 3, 2009, the contents of both incorporated herein by reference.

FIELD OF THE INVENTION

The present invention relates generally to touch systems and in particular to a system and method for injecting ink into an application executed by a computer and displayed on a touch panel.

BACKGROUND OF THE INVENTION

Touch systems are well known in the art and many variations exist. In all cases, touch systems include a touch panel having a touch surface on which contacts are made using a pointer. Pointer contacts with the touch surface are detected and are used to generate corresponding output that represent the positions on the touch surface where contacts are made. The contact position output is typically fed to a computer that executes one or more applications programs. The computer generates image data that is used to present images on the touch surface. The computer uses the contact position output to update the image data and thus, the images presented on the touch surface. In this manner, the images presented on the touch surface are updated to reflect the activity of the pointer on the touch surface.

For example, U.S. Pat. No. 5,448,263 to Martin, assigned to the assignee of the present invention, discloses a passive analog resistive touch panel coupled to a computer. The computer provides image data to a projector that projects images onto the touch surface of the touch panel. The touch panel includes a tool tray that supports a plurality of differently coloured pens. When a user contacts the touch surface either with a finger, other pointer or a pen, the touch panel outputs signals representing the contact position on the touch surface. The contact position data is conveyed to the computer and is mapped to the computer display. If a finger or other pointer is used to contact the touch surface, the touch system operates in a pointer mode and the contact position data is treated as a mouse event. This allows the user to operate the computer in a manner similar to using a computer mouse i.e. select menus, manipulate objects etc. simply by contacting the touch surface. If a pen is lifted from the tool tray and is used to contact the touch surface, the touch system operates in an ink mode and the contact position data is recorded as writing or drawing.

When the computer is running an applications program in a Windows environment, a computer desktop image is presented on the touch surface that includes icons representing the various applications programs available for selection. When an icon is selected, a window for the selected applications program is opened. The window typically includes a frame, one or more tool bars, optional scroll bars and an active area surrounded by the frame, tool bars and scroll bars. In the pointer mode, contacts on the touch surface are treated as mouse event input to the computer desktop. The computer in response to the mouse event input controls the computer desktop or selected applications program according to the touch panel output and updates the image data conveyed to the projector for display to reflect the pointer activity.

In the ink mode, an acetate image identical to the computer desktop image overlies the computer desktop image to provide a surface on which ink can be drawn. When a pen contacts the touch surface, the contact position data is treated as writing or drawing. In this case, the computer updates the image data conveyed to the projector for display so that the writing or drawing is displayed on the acetate image.

In many instances, it is desired to take handwritten information appearing on the acetate image and place it in the underlying applications program. Heretofore, there has been no convenient mechanism to achieve this.

It is therefore an object of the present invention to provide a novel system and method for injecting ink that is displayed on a touch panel into an application executed by a computer.

SUMMARY OF THE INVENTION

According to one aspect of the present invention there is provided a method of injecting ink into an application executed by a computer and displayed on a touch panel, said method comprising the steps of:

detecting when a predetermined gesture is made with a pointer on said touch panel, on which ink has been entered and overlies said application;

performing recognition to convert said ink into a form suitable for said application; and entering the recognized ink into said application.

In a preferred embodiment, the predetermined gesture is a stationary pointer contact on the touch panel that is maintained for at least a threshold duration. It is also preferred that the recognized ink is entered into the application at the location on the touch panel whether the pointer is held. Preferably, the method further comprises the step of providing visual feedback on the touch panel while the pointer is being held on the touch panel. The method also includes the step of visually presenting the recognized ink on the touch panel prior to the entering.

In one embodiment, the recognized ink is presented as a selectable item in a menu. The entering is performed upon selection of the item. A clear writing item is also provided in the menu.

Alternatively, the visual feedback may be a display of the recognized ink. In this case, the recognized ink is the visual feedback and is presented visually when the percentage accuracy of recognition is over a threshold. In yet another embodiment, a number of options for the recognized ink are presented on the touch panel prior to the entering.

According to another aspect of the present invention there is provided a system for injecting ink into an application executed by a computer and displayed on a touch panel, said system comprising:

means for detecting when a predetermined gesture is made with a pointer on said touch panel, on which ink has been entered and overlies said application;

means for performing recognition to convert said ink into a form suitable for said application; and means for entering the recognized ink into said application.

According to yet another aspect of the present invention there is provided a touch system comprising:

a touch panel having a touch surface;

a projector presenting images onto said touch surface; and a computer executing an applications program and being coupled to said touch panel and said projector, said computer being responsive to contact output generated by said touch panel in response to proximity of a pointer to said touch surface and updating image data conveyed to said projector so that images presented on said touch surface reflect pointer activity, said computer executing a gesture responsive ink injection routine to detect when a selected gesture is made with said pointer on said touch surface, said gesture responsive ink injection routine performing recognition to convert ink drawn on said touch surface into a form suitable for said applications program when said selected gesture is recognized and entering said recognized ink into said applications program.

According to still yet another aspect of the present invention there is provided a computer program product including a computer readable medium having a computer program for injecting ink into an application executed by a computer and displayed on a touch panel embodied thereon, said computer program including:

computer program code for detecting when a predetermined gesture is made with a pointer on said touch panel, on which ink has been entered and overlies said application;

computer program code for performing recognition to convert said ink into a form suitable for said application; and computer program code for entering the recognized ink into said application.

The present invention provides advantages in that recognized ink can be entered into an application quickly, easily and in an intuitive manner using a pointer gesture.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
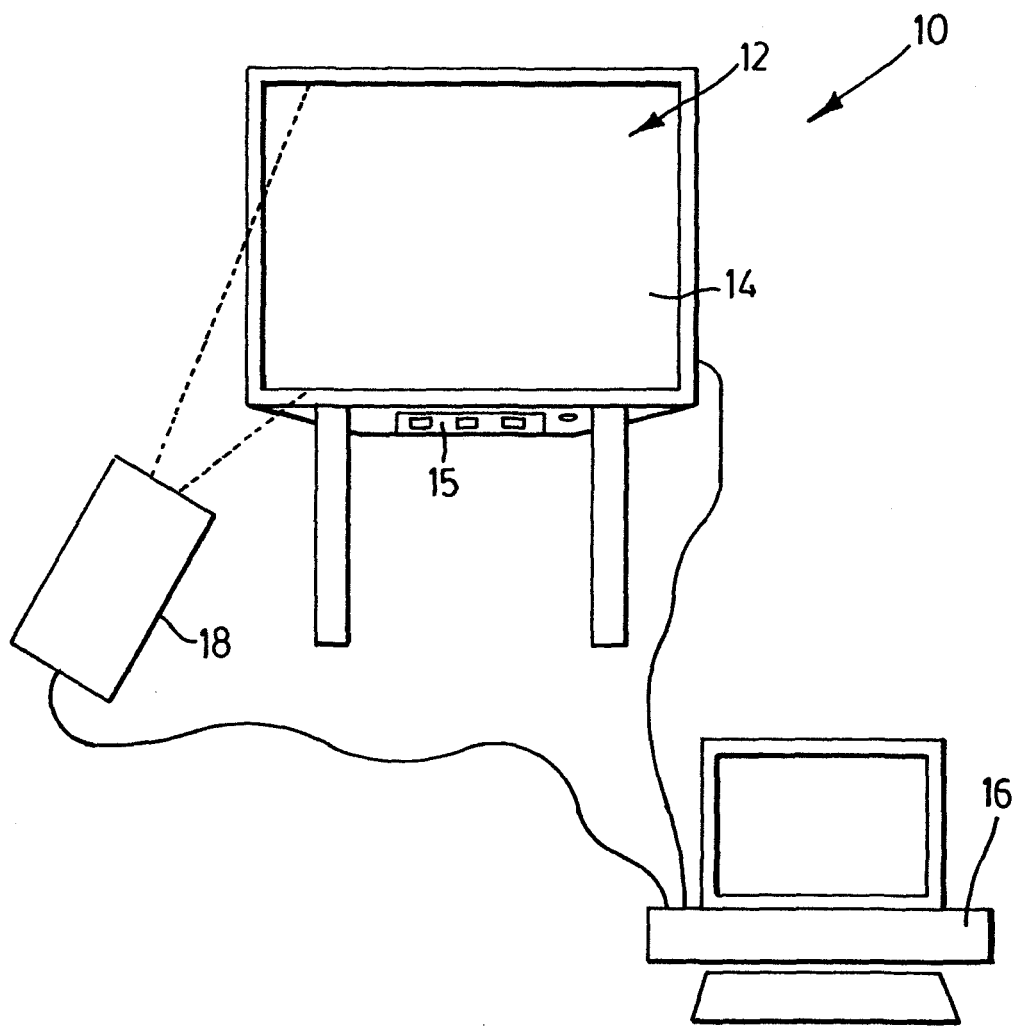
FIG. 1 is schematic diagram of an interactive touch system including a touch panel having a touch surface.

Turning now to FIG. 1, an interactive touch system similar to that disclosed in U.S. Pat. No. 5,448,263 to Martin is shown and is generally identified by reference numeral 10. As can be seen, touch system 10 includes a touch panel 12 having a touch surface 14. The touch panel 12 in this embodiment is of the analog resistive type and includes a tool tray 15 that supports a plurality of differently coloured pens (not shown). Touch panel 12 is responsive to contacts on the touch surface 14 made using either a finger, other pointer or pen and generates output representative of the locations on the touch surface 14 where contacts are made. The contact position output of the touch panel 12 is fed to a computer 16 executing one or more applications programs and is treated either as mouse events or writing or drawing depending on the object used to contact the touch surface 14. Specifically, the contact position output of the touch panel 12 is treated as mouse events if a finger or other pointer is used to contact the touch surface 14. The contact position is however treated as writing or drawing when a pen is lifted from the tool tray 15 and is used to contact the touch surface 14. In this manner the touch system either operates in a pointer mode or ink mode depending on the object used to contact the touch surface 14. The computer 16 is also coupled to a front or rear projector 18 and provides image data to the projector. The projector 18 in turn presents images on the touch surface 14 of the touch panel. The touch panel 12, computer 16 and projector 18 form a closed-loop so that user contacts with the touch panel 12 can be recorded as writing or drawing or used to control execution of an applications program executed by the computer 16.

Figure 2:
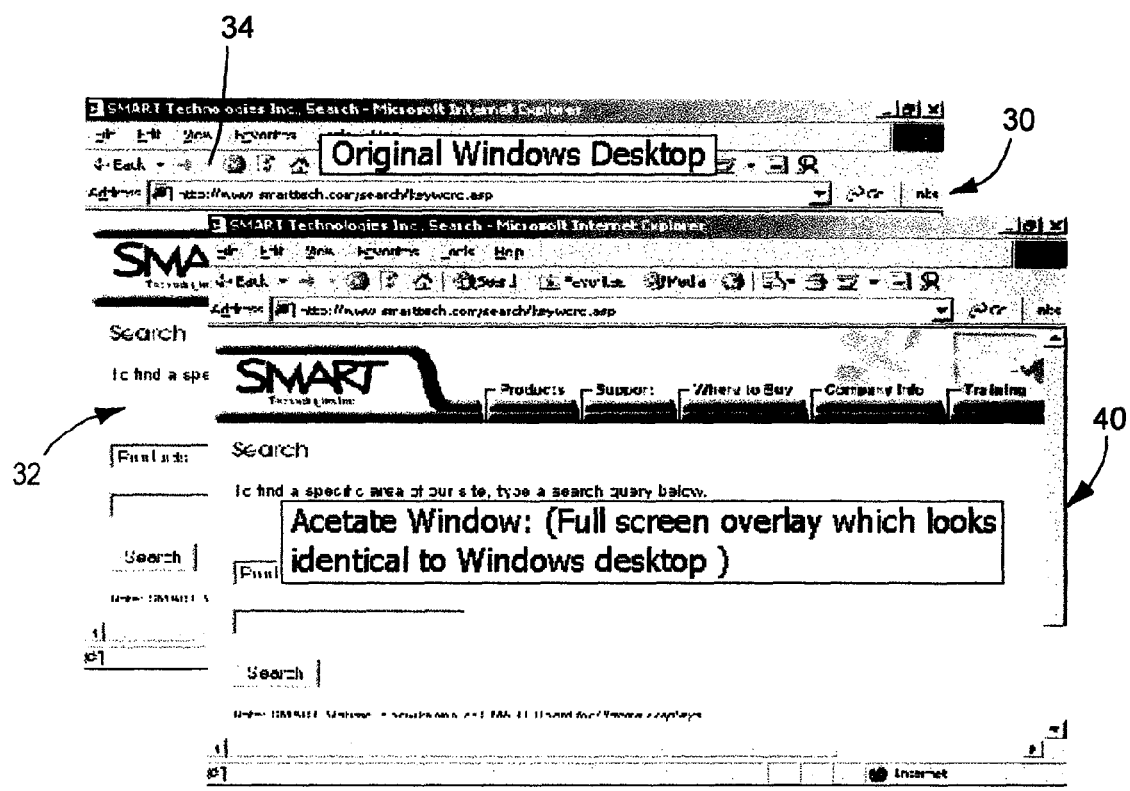
FIG. 2 is a view of a computer desktop image together with an acetate desktop image presented on the touch surface of the touch panel.

In the present embodiment, the computer 16 runs in a Windows environment and provides image data to the projector 18 so that a computer desktop image is presented on the touch surface 14. The computer desktop image presents one or more icons that can be selected to open associated applications programs. When an applications program is selected, a window for the applications program is opened. Turning now to FIG. 2, an applications program window 30 including an active area 32 bordered by a frame and one or more tool bars 34 is shown presented on the touch surface 14.

When a pen is used to contact the touch surface 14 and the touch system is conditioned to the ink mode, an acetate image 40 identical to the computer desktop image is displayed over the computer desktop image as shown FIG. 2. The acetate image 40 provides a surface for writing or drawing (commonly referred to as "ink") so that the ink is not used by the computer 16 to update the underlying computer desktop image 30. Contact position data returned to the computer 16 by the touch panel 12 in response to pen contacts with the touch surface 14 are used by the computer to update the image data conveyed to the projector 18 so that the ink appears on the acetate image 40. As mentioned previously, once ink has been entered on the acetate image 40, in many cases it is desired to input, enter or apply ("inject") the ink to an underlying applications program.

To facilitate injecting ink displayed on the acetate image 40 into the underlying applications program, the computer 16 executes a gesture responsive ink injection routine. In this manner, a user is able to inject ink displayed on the acetate image 40 into the applications program in a quick and easy manner.

Figure 3:
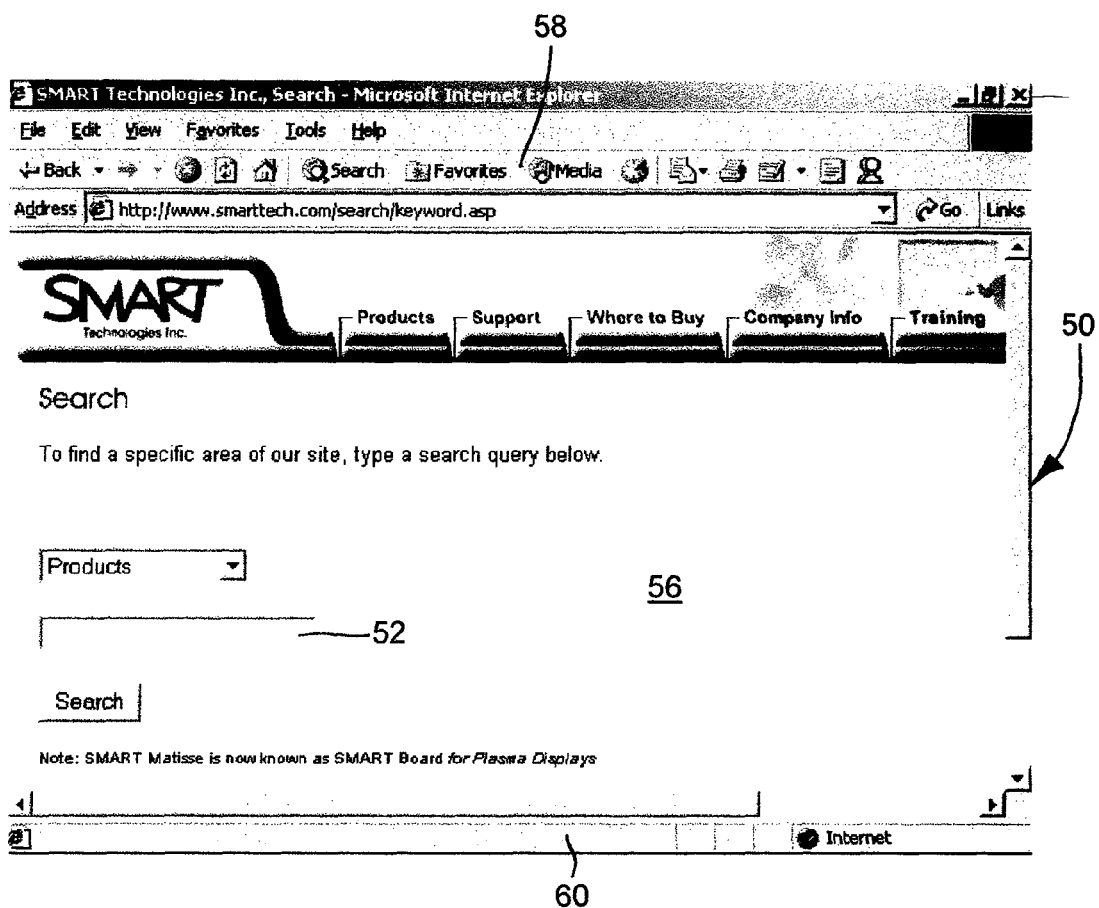
FIG. 3 is a view of a computer desktop image and overlying acetate image, each having a text field, presented on the touch surface of the touch panel.
Figure 4:
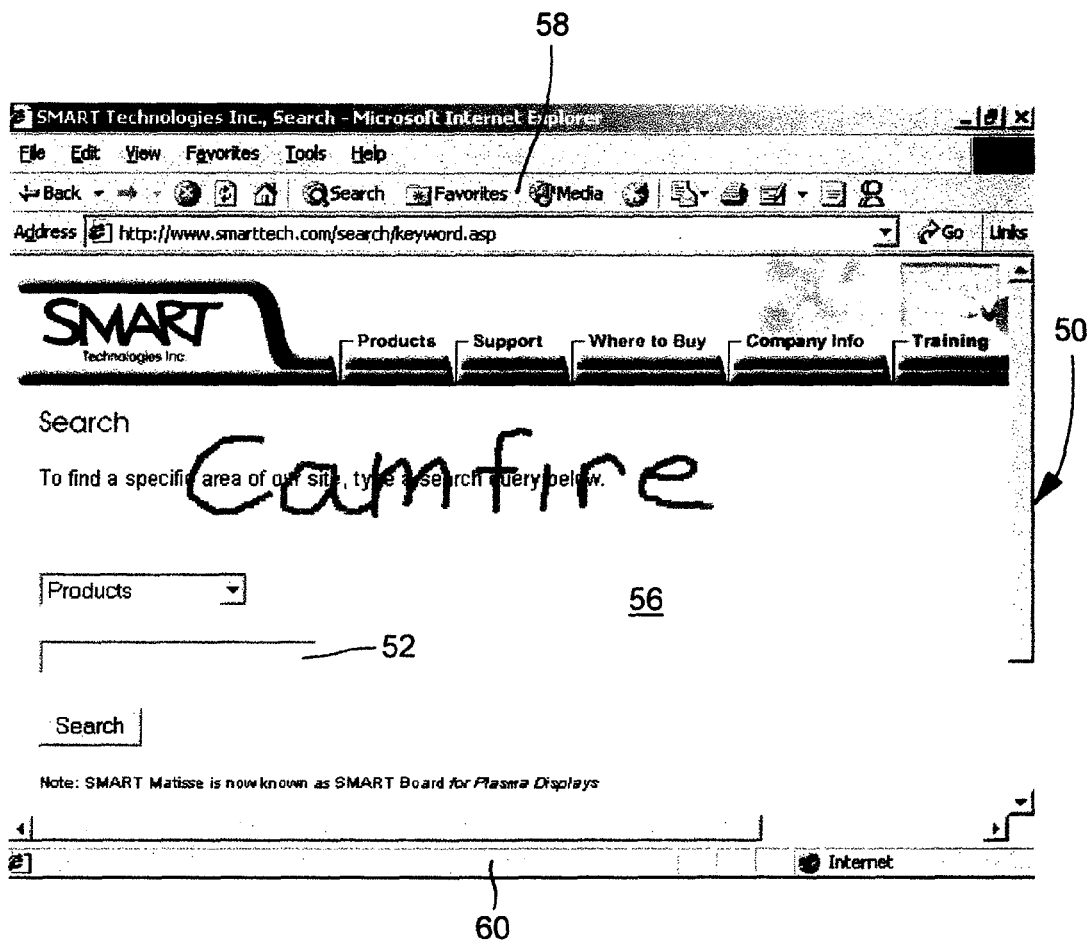
FIG. 4 is the computer desktop image and overlying acetate image of FIG. 3 with writing applied to the acetate image.
Figure 5:
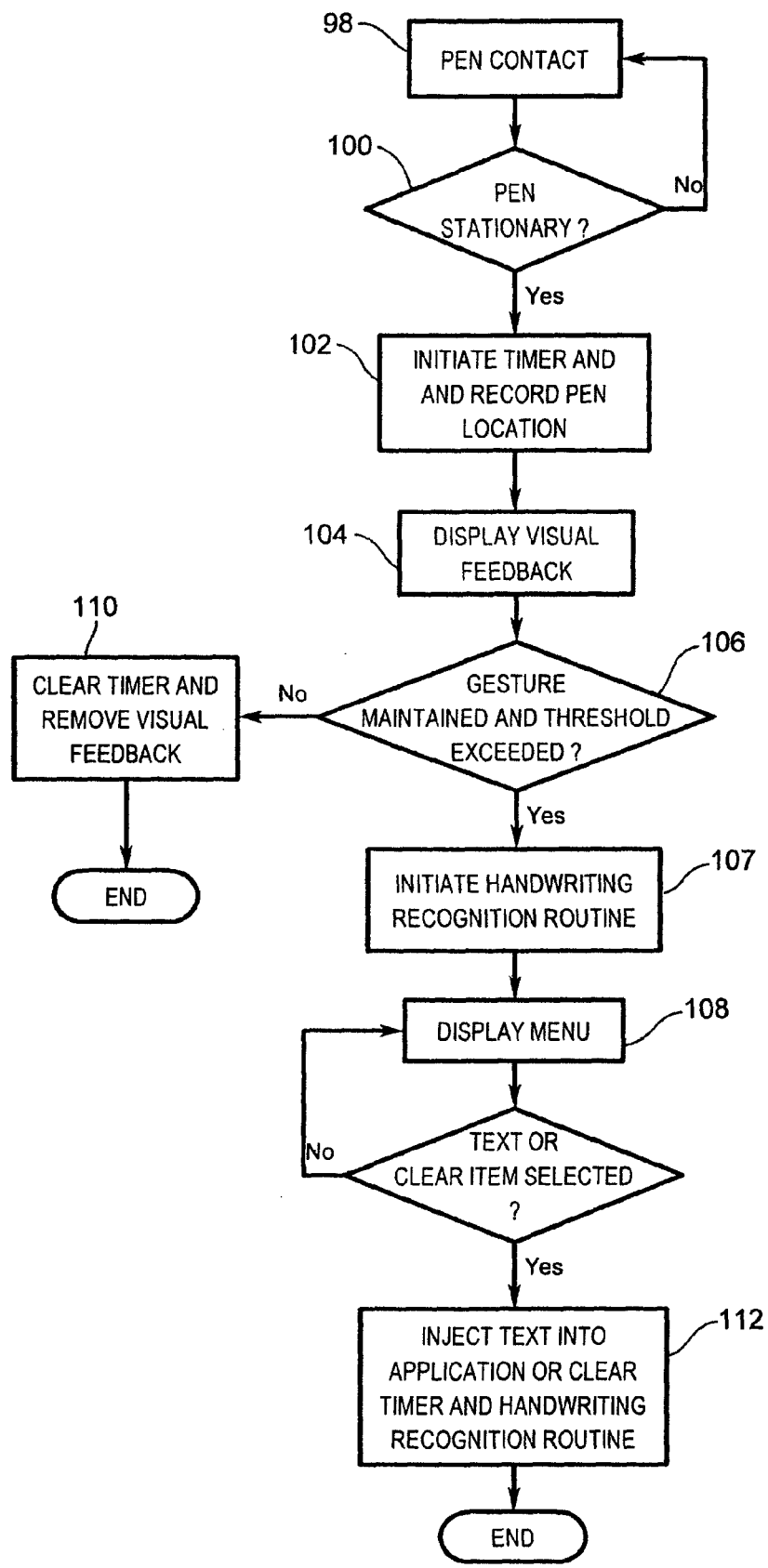
FIG. 5 is a flow chart showing the steps performed by a gesture responsive ink injection routine.

Turning now to FIG. 3, an applications program window 50 including a text field 52 and an identical overlying acetate image are shown displayed on the touch surface 14 of touch panel 12. The applications program window 50 also includes an active area 56 accommodating the text field 52, a tool bar 58 and a border 60. FIG. 4 shows the applications program window 50 and overlying acetate image of FIG. 3 after a pen has been used to write the word "camfire" on the touch surface 14.

As mentioned above, the computer 16 is responsive to the output generated by the touch panel 12 in response to writing with a pen and provides updated image data to the projector 18 so that the image displayed on the touch surface 14 reflects the pen activity. The gesture responsive ink injection routine recognizes ink on the acetate image 40 in response to a predetermined gesture made on the touch panel 12 using the pen, and injects the ink into the applications program presented in the application program window 50. In the present embodiment, the gesture responsive ink injection routine recognizes handwriting on the acetate image 40 and injects corresponding text into the applications program presented in the application program window 50. Specifics of the gesture responsive ink injection routine will now be described with particular reference to FIGS. 5 to 8.

Figure 6:
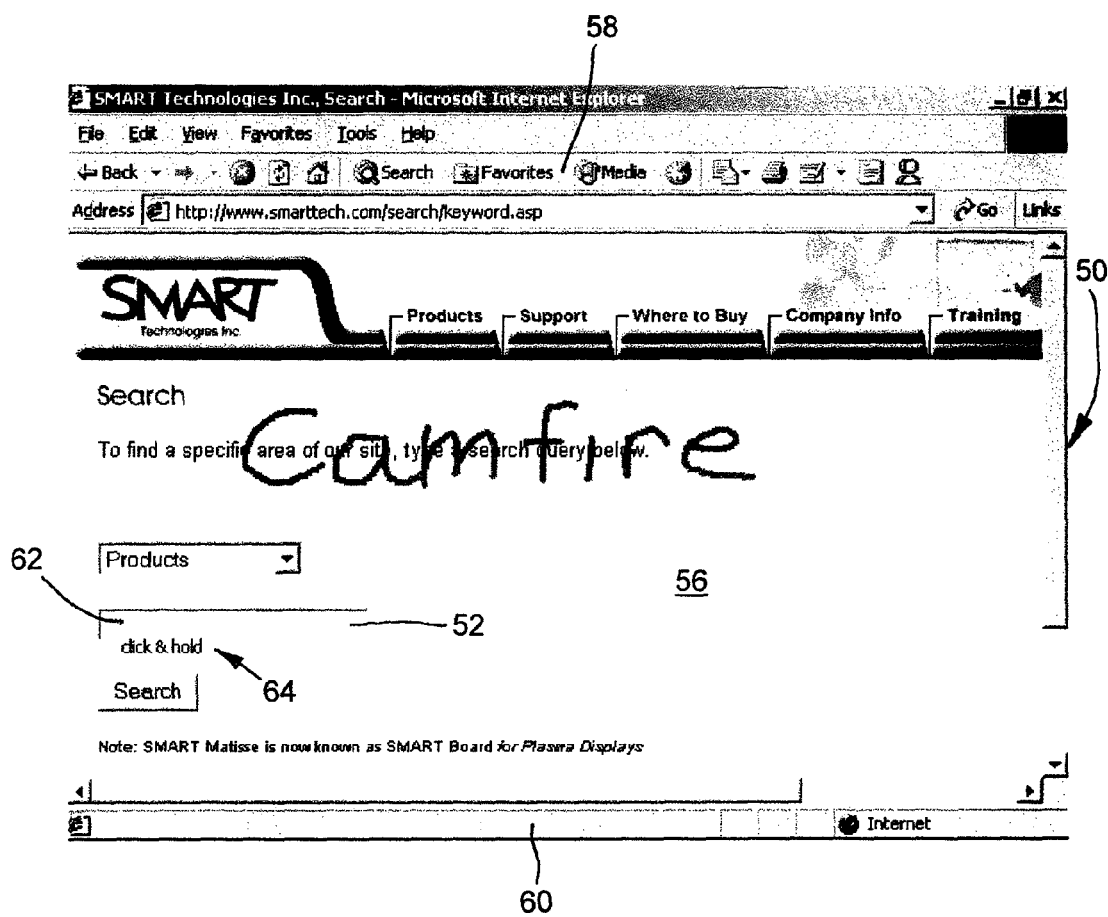
FIG. 6 is the computer desktop image and overlying acetate image of FIG. 4 with a pointer held on the touch surface at the text field.

When a user wishes to inject writing as text into a text field of the applications program displayed within the window, the user simply needs to hold the pen against the touch surface 14 at the location where the writing is to be injected as indicated by the pen tip 62 in FIG. 6. In particular, when the pen contacts the touch surface 14 (see step 98 in FIG. 5), the gesture responsive ink injection routine initially assumes the pen contact is for the purpose of writing or drawing. If however, the pen remains stationary on the touch surface 14 for a short duration, in this embodiment 500 ms, the gesture response ink injection recognizes the stationary pen contact as the predetermined gesture (step 100). The gesture responsive ink injection routine in turn initiates a timer and records the location of the pen on the touch surface 14 (step 102). The gesture responsive ink injection routine then updates the image data conveyed to the projector 18 so that the displayed image provides visual feedback to the user signifying that the timer has been initiated. In this example, the phrase "click & hold" 64 is displayed below the text field 52 where the pointer is held (step 104).

Figure 7:
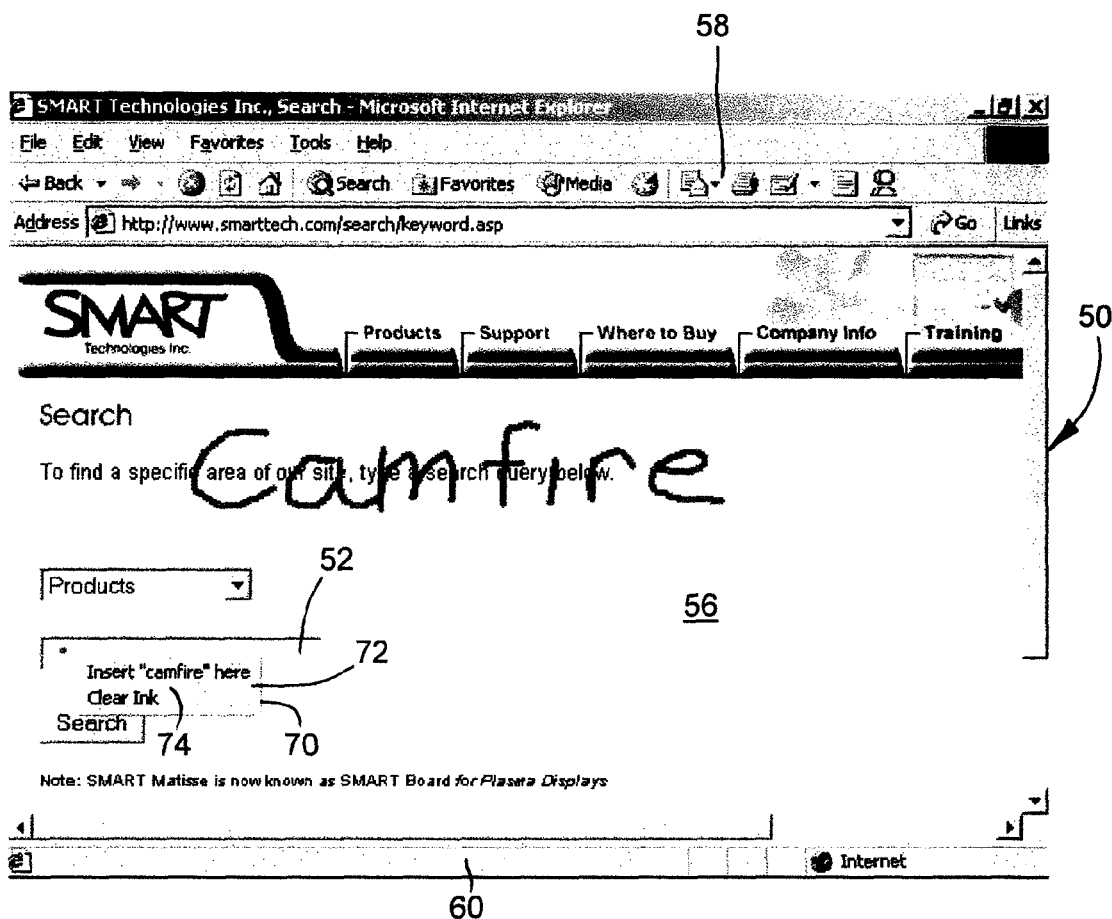
FIG. 7 is the computer desktop image and overlying acetate image of FIG. 6 including a menu that appears after the pointer has been held on the touch surface for a threshold duration.

Once the timer reaches a threshold value and the gesture has been maintained (step 106), the gesture responsive ink injection routine invokes a handwriting recognition routine to recognize the writing displayed on the acetate image (step 107) and updates the image data conveyed to the projector 18 so that a menu 70 is displayed adjacent the pen location as shown in FIG. 7 (step 108). In this example, the menu includes two items, namely a text item 72 that represents the result of the handwriting recognition routine, and a clear ink item 74. If the pen is moved from its location before the timer reaches the threshold count, the gesture responsive ink injection routine clears the timer and updates the image data conveyed to the projector 18 to remove the visual feedback (step 110). In the present embodiment, the threshold duration is 2 seconds. Those of skill in the art will however appreciate that this threshold duration is arbitrary and may be changed to suit the particular environment in which the touch system is being used.

Figure 8:
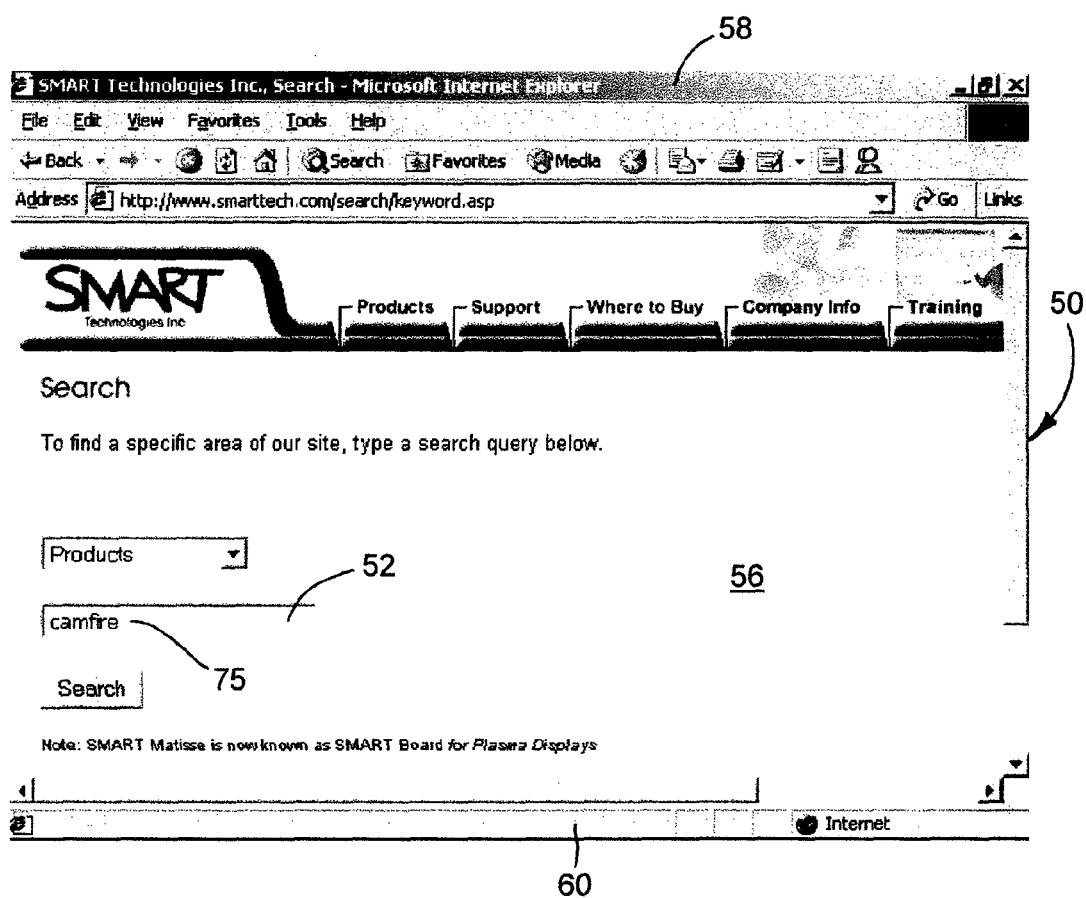
FIG. 8 is the computer desktop image and overlying acetate image of FIG. 7 after the insert text menu item has been selected.

If the user selects the text item 72, the gesture responsive ink injection routine inserts the result of the handwriting recognition routine as text into the applications program and updates the image data so that the image projected onto the touch surface 14 shows the selected text 76 inserted into the text field 52 as shown in FIG. 8 (step 112). During the text insertion process, the gesture responsive ink injection routines removes the acetate image and generates a mouse click event at the pen tip location 62. This causes the underlying applications program to set its input focus to the pen tip location 62. Keystrokes corresponding to the recognized text are then fed to the underlying applications program and the image data is updated so that the text is presented in the selected text field of the applications program. If the pen is still active i.e. it remains lifted from the tool tray 15, the acetate image is restored allowing inking to continue. If the user selects the clear item 74, the gesture responsive ink injection routine clears the result of the handwriting recognition routine and clears the timer (step 112).

As will be appreciated, the gesture responsive ink injection routine executed by the computer 16 allows writing made on the touch panel 12 to be inserted into an applications program quickly and easily using a pen gesture. Visual feedback allows the user to determine when gesture recognition is being performed and provides the user with the results of the handwriting recognition. In this manner, if the results of the handwriting recognition are accurate, the recognized handwriting can be easily selected so that the corresponding text can be injected into the applications program. If the results are inaccurate the results can be cleared and the process re-attempted.

Figure 9:
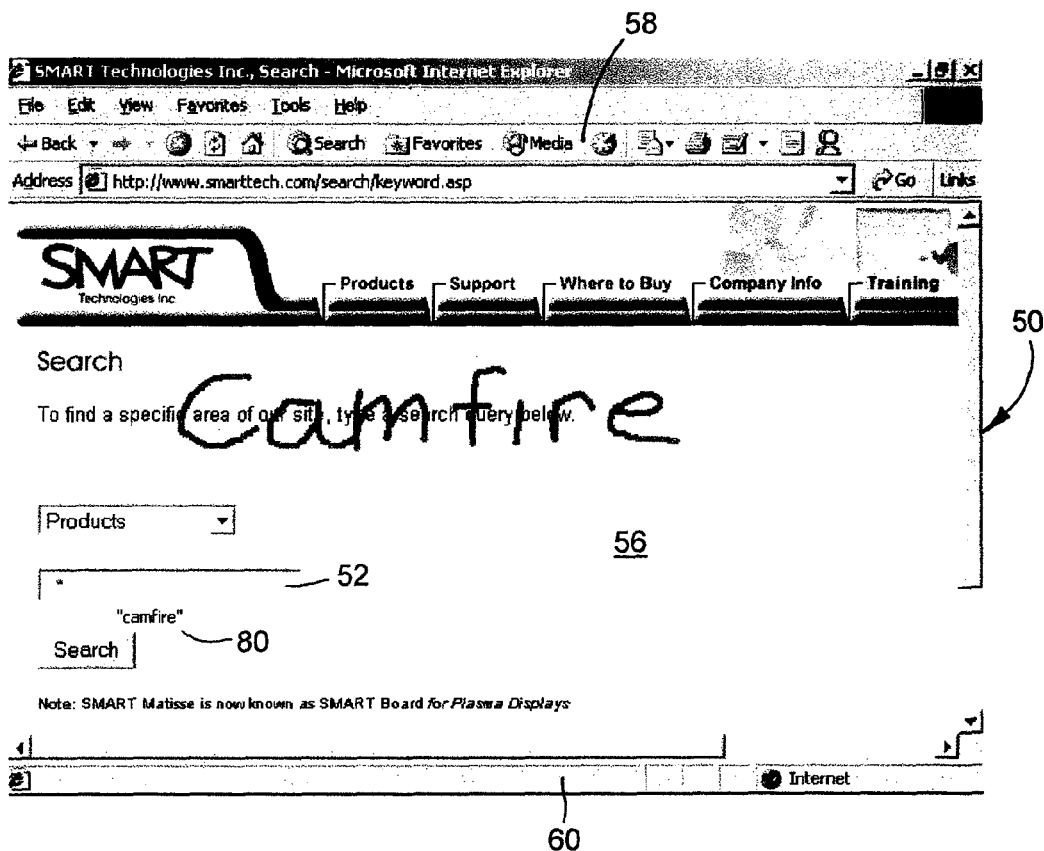
FIG. 9 is an alternative computer desktop image and overlying acetate image similar to FIG. 6 with a pointer held on the touch surface at the text field.
Figure 10:
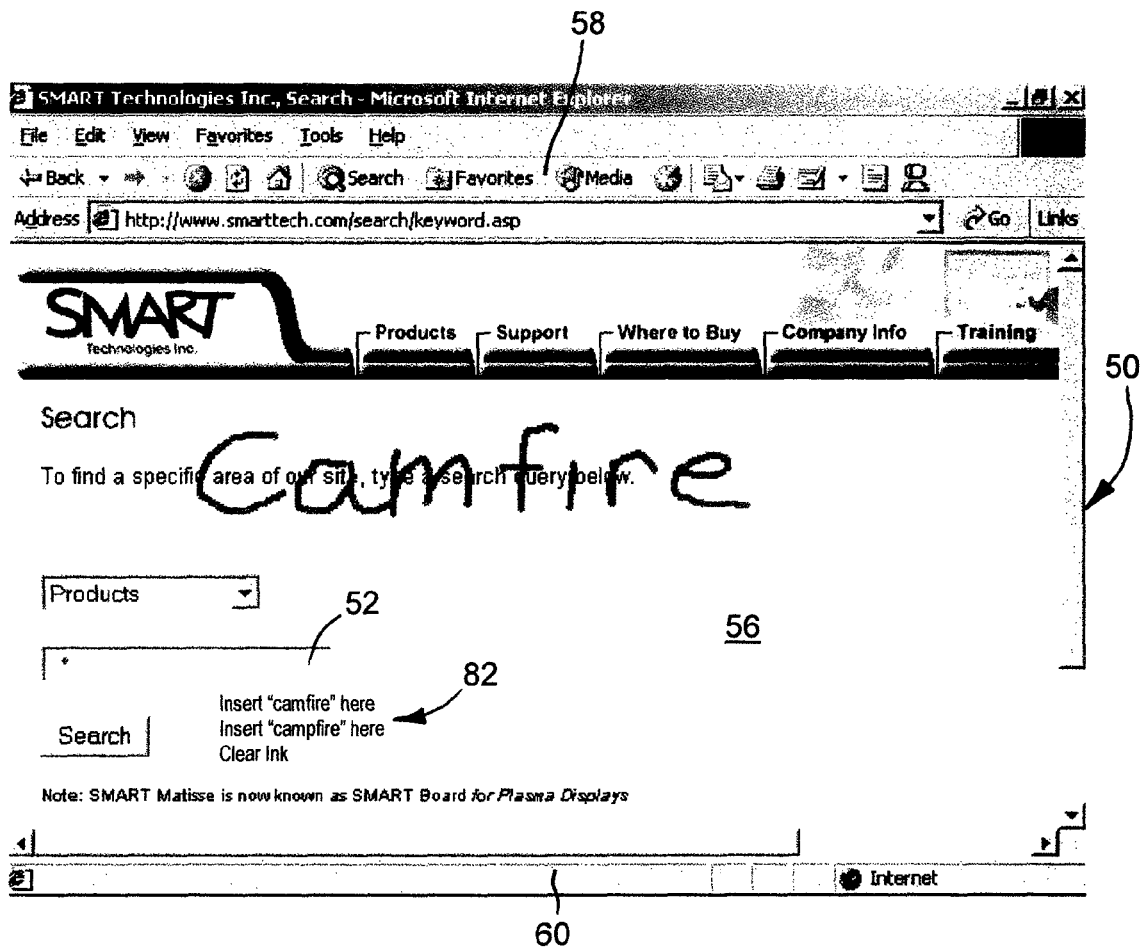
FIG. 10 is the computer desktop image and overlying acetate image of FIG. 7 including a menu that appears after the pointer has been held on the touch surface for a threshold duration.

Although the visual feedback signifying that the timer has been initiated is shown as the phrase "click & hold", other forms of visual feedback can be used. For example, as shown in FIG. 9, the visual feedback may be the most likely result returned by the handwriting recognition routine. In this example, if the most likely result returned by the handwriting recognition routine has a percentage accuracy greater than or equal to 90%, the result 80 is displayed as the visual feedback. In this case, when the pen remains stationary on the touch surface 14 for the threshold duration, the gesture responsive ink injection routine automatically injects the result as text into the text field 52 of the applications program. If the most likely result has a percentage accuracy less than 90%, the "click & hold" phrase is presented as visual feedback. When the pen remains stationary on the touch surface 14 for the threshold duration, the gesture responsive ink injection routine presents a menu 82 that includes menu items representing the various potential results returned by the handwriting recognition routine as shown in FIG. 10.

The preferred embodiments describe the gesture used to invoke the gesture responsive ink injection routine as a stationary pointer condition that exceeds a threshold duration. It will however be appreciated that other suitable gestures can be used to invoke the gesture responsive ink injection routine such as for example a backwards V gesture.

Although the touch system has been described as switching between the pointer mode and the ink mode depending on the type of pointer used to contact the touch surface, this is for illustrative purposes only. For example, transitions between the pointer mode and ink mode can be achieved by selecting appropriate buttons on a small window that remains visible on the touch surface 14. In this manner, the same pointer can be used to generate mouse events or ink. The gesture responsive ink injection routine can be used in any touch system that includes a touch panel on which a computer image is presented. Such touch systems include active touch systems that make use of special pointers that emit signals such as infrared light, visible light, ultrasonic frequencies and electromagnetic frequencies in order to activate the touch surfaces. These touch systems also include passive surface acoustic wave or capacitive-type touch systems as well as camera-based touch systems such as that disclosed in International PCT Application No. WO 02/03316 to Smart Technologies Inc. et al., the assignee of the present invention.

Although preferred embodiments of the present invention have been described, those of skill in the art will appreciate that variations and modifications may be made without departing from the spirit and scope thereof as defined by the appended claims.

What is claimed is:

1. A method comprising:
   receiving handwritten input and displaying the handwritten input on a graphic surface presented on a display;
   in response to a stationary pointer contact on a touch surface exceeding a first non-zero threshold duration, updating the graphic surface so as to provide a visual indication of the start of a potential input gesture entry;
   determining when an input gesture has been entered following said updating, said input gesture indicating a position in an application;
   in response to the input gesture, performing recognition on the handwritten input to convert the handwritten input into a different form; and
   entering the converted handwritten input into said application substantially at the position indicated by said input gesture.

2. The method of claim 1 wherein said input gesture is determined when the stationary pointer contact on said touch surface exceeds a second non-zero threshold duration.

3. The method of claim 2 further comprising displaying said converted handwritten input on said graphic surface.

4. The method of claim 3 wherein said converted handwritten input is displayed on said graphic surface at a location generally corresponding to the location of said stationary pointer contact on said touch surface.

5. The method of claim 1 further comprising displaying visual feedback on said graphic surface to signify recognition of said gesture.

6. The method of claim 5 wherein said displayed visual feedback is text.

7. The method of claim 6 wherein said text comprises a list of selectable items, at least one selectable item in said list being a text representation of the converted handwritten input.

8. The method of claim 7 wherein said entering is performed upon selection of said at least one selectable item.

9. The method of claim 8 wherein said list of selectable items comprises a clear item, said method being terminated upon selection of said clear item.

10. The method of claim 7 wherein said list of selectable items comprises a plurality of possible text representations of the converted handwritten input.

11. The method of claim 10 wherein upon selection of one of the plurality of possible text representations of the converted handwritten input, the entering is performed using converted handwritten input corresponding to the selected possible text representation.

12. The method of claim 11 wherein said list of selectable items comprises a clear item, said method being terminated upon selection of said clear item.

13. The method of claim 6 wherein said text is a representation of the converted handwritten input when the percentage accuracy of recognition is over a threshold.

14. The method of claim 13 wherein said percentage accuracy threshold is 90%.

15. The method of claim 5 wherein said visual feedback is displayed prior to entering the converted handwritten input into said application.

16. The method of claim 1 wherein said graphic surface comprises a computer desktop image.

17. A method comprising:
    receiving handwritten input entered via pointer interaction with a touch surface and displaying the handwritten input on a graphic surface presented on said touch surface;
    in response to a stationary pointer contact on the touch surface exceeding a first non-zero threshold duration, updating the graphic surface so as to provide a visual indication of the start of a potential input gesture entry;
    determining when a gesture has been input via pointer interaction with said touch surface following said updating, said gesture indicating a position in an application;
    in response to said gesture, performing recognition on the displayed handwritten input to convert the handwritten input into a different form;
    displaying the recognition result together with a clear result option;
    entering the converted handwritten input into said application substantially at the position indicated by said gesture and displaying the converted handwritten input on said touch surface when the displayed recognition result is selected; and
    clearing the recognition result when said clear result option is selected.

18. The method of claim 17 wherein said gesture is a stationary pointer contact on said touch surface that exceeds a threshold duration.

19. The method of claim 18 wherein said converted handwritten input is displayed on said touch surface at a location generally corresponding to the location of said stationary pointer contact on said touch surface.

20. The method of claim 17 wherein the displayed recognition result comprises a plurality of selectable possible text representations of said handwritten input.

21. A method comprising:
    displaying a graphic surface on a touch surface to provide a surface for handwritten input;
    receiving handwritten input entered via pen tool interaction with said touch surface and displaying the handwritten input on the graphic surface;
    receiving mouse input entered via finger interaction with said touch surface and entering the mouse input into a computer application;
    in response to a stationary pen tool contact on said touch surface exceeding a first non-zero threshold duration, updating the graphic surface so as to provide a visual indication of the start of a potential input gesture entry;
    determining when a gesture has been input via pen tool interaction with said touch surface following said updating;
    in response to said gesture, performing recognition on the displayed handwritten input to convert the handwritten input into a different form; and
    entering the converted handwritten input into said computer application substantially at a position indicated by said gesture.

22. The method of claim 21 wherein said gesture is a stationary pointer contact on said touch surface that exceeds a threshold duration.

23. The method of claim 22 wherein said converted handwritten input is displayed on said touch surface at a location generally corresponding to the location of said stationary pointer contact on said touch surface.

24. The method of claim 21 further comprising displaying visual feedback to signify recognition of said gesture.

25. The method of claim 24 wherein said visual feedback is displayed prior to entering the converted handwritten input into said application.

26. The method of claim 21 wherein said displayed visual feedback is text.

27. The method of claim 26 wherein said text comprises a list of selectable items, at least one selectable item in said list being a text representation of the converted handwritten input.

28. The method of claim 27 wherein said entering is performed upon selection of said at least one selectable item.

29. The method of claim 28 wherein said list of selectable items comprises a clear item, said method being terminated upon selection of said clear item.

30. The method of claim 28 wherein said list of selectable items comprises a plurality of possible text representations of the converted handwritten input.

31. The method of claim 30 wherein upon selection of one of the plurality of possible text representations of the converted handwritten input, the entering is performed using converted handwritten input corresponding to the selected possible text representation.

32. The method of claim 31 wherein said list of selectable items comprises a clear item, said method being terminated upon selection of said clear item.

33. The method of claim 26 wherein said text is a representation of the recognized handwritten input when the percentage accuracy of recognition is over a threshold.

34. The method of claim 33 wherein said percentage accuracy threshold is 90%.

35. A touch system comprising:
a touch panel having a touch surface;
a device for generating an image that is presented on said touch surface; and
computing structure executing at least one program and being coupled to said touch panel and said device, said computing structure being responsive to output generated by said touch panel in response to proximity of a pointing device to said touch surface and updating image data conveyed to said device so that images presented on said touch surface reflect the activity of said pointing device, said computing structure executing a routine to detect when a stationary pointing device contact on said touch surface that exceeds a first non-zero threshold duration occurs and in response updating the image data to signify visually the start of a potential input gesture entry, to determine when a gesture is made via interaction of said pointing device with said touch surface following said updating, in response to said gesture, to convert handwritten input drawn on said touch surface into a form suitable for said at least one program, to display the result of the conversion together with a clear result option, to enter the handwritten input into said at least one program substantially at a position indicated by said gesture upon selection of the conversion result and to clear the conversion result upon selection of said clear result option.

36. A touch system according to claim 35 wherein the conversion result comprises one or more possible text representations of the handwritten input, and wherein the converted handwritten input corresponding to a selected text representation is entered into said at least one program.

37. A touch system comprising:
a touch panel having a touch surface;
a device for generating an image that is presented on said touch surface; and
computing structure executing at least one program and being coupled to said touch panel and said device, said computing structure being responsive to output generated by said touch panel in response to proximity of a pointing device to said touch surface and updating image data conveyed to said device so that images presented on said touch surface reflect the activity of said pointing device, said computing structure executing a routine to detect when a stationary pointing device contact on said touch surface that exceeds a first non-zero threshold duration occurs and in response updating the image data to signify visually the start of a potential input gesture entry, to determine when a gesture is made via interaction of said pointing device with said touch surface following said updating, to display visual feedback signifying recognition of said gesture, in response to said gesture to convert handwritten input drawn on said touch surface into a form suitable for said at least one program, and to enter the handwritten input into said at least one program substantially at a position indicated by said gesture upon selection of the result.

38. A touch system according to claim 37 wherein said visual feedback is at least one possible text representation of the handwritten input.

39. A computing system comprising:
computing structure executing an application; and
a display device communicating with said computing structure, said display device presenting an image responsive to computing structure image data, wherein said computing structure is configured to:
detect handwritten input;
in response to a stationary pointer contact on a touch surface exceeding a first non-zero threshold duration, update the graphic surface so as to provide a visual indication of the start of a potential input gesture entry;
determine when an input gesture has been entered following the update, said input gesture representing a command for converting the handwritten input and an indication of a position in the application;
in response to the input gesture, convert the handwritten input into a different form; and
enter the converted handwritten input into said application-substantially at the position indicated by said gesture.

* * * * *